United States Patent
Crean et al.

(10) Patent No.: US 8,437,036 B2
(45) Date of Patent: May 7, 2013

(54) IMAGE PATH UTILIZING SUB-SAMPLED CROSS-CHANNEL IMAGE VALUES

(75) Inventors: Peter A. Crean, Penfield, NY (US); Robert P. Loce, Webster, NY (US); Edgar Bernal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 985 days.

(21) Appl. No.: 12/258,871

(22) Filed: Oct. 27, 2008

(65) Prior Publication Data

US 2010/0103440 A1     Apr. 29, 2010

(51) Int. Cl.
*H04N 1/60* (2006.01)

(52) U.S. Cl.
USPC ......... 358/1.9; 358/3.26; 358/3.27; 358/3.28; 358/540

(58) Field of Classification Search .......... None
See application file for complete search history.

(56) References Cited

U.S. PATENT DOCUMENTS

| | | | |
|---|---|---|---|
| 5,867,277 A * | 2/1999 | Melen et al. | 358/296 |
| 6,430,311 B1 * | 8/2002 | Kumada | 382/162 |
| 6,738,169 B1 * | 5/2004 | Nakase | 358/539 |
| 7,082,218 B2 * | 7/2006 | Pollard et al. | 382/167 |
| 7,257,271 B2 * | 8/2007 | Adams et al. | 382/275 |
| 7,295,346 B2 | 11/2007 | Loce et al. | |
| 7,545,997 B2 * | 6/2009 | Lieberman et al. | 382/298 |
| 8,305,640 B2 * | 11/2012 | Rivshin et al. | 358/1.9 |
| 2003/0063201 A1 * | 4/2003 | Hunter et al. | 348/241 |
| 2004/0028271 A1 * | 2/2004 | Pollard et al. | 382/162 |
| 2006/0274337 A1 | 12/2006 | Dalal et al. | |
| 2007/0009176 A1 * | 1/2007 | Lim et al. | 382/275 |
| 2007/0035748 A1 | 2/2007 | Zhang et al. | |
| 2007/0035749 A1 * | 2/2007 | Zhang et al. | 358/1.9 |
| 2009/0009831 A1 * | 1/2009 | Pollard et al. | 358/505 |
| 2010/0225972 A1 * | 9/2010 | Crean et al. | 358/3.06 |

* cited by examiner

*Primary Examiner* — Dung Tran
(74) *Attorney, Agent, or Firm* — Fay Sharpe LLP

(57) ABSTRACT

A technique for cross-channel correction in real time for digital color printing in which the full resolution value of a selected colorant is combined with low resolution versions of the remaining colorants to provide a basis for correcting the selected colorant based upon the data for the other colorants employed. The pixel values of sub-samples of the remaining colorants are derived from the cell in which the full resolution selected colorant is taken; and, the desired output value is selected from a look-up table established for the known printing process.

20 Claims, 3 Drawing Sheets

IMAGE PATH UTILIZING SUB-SAMPLED CROSS-CHANNEL IMAGE VALUES

BACKGROUND

The present disclosure relates to printing from digital images and particularly color printing. Where printing is accomplished by deposition of multi-channel colorants as for example, printers utilizing cyan, magenta, and yellow and black colorants, it has been difficult to control the quality of the color marking by controlling only the individual color channel marking; and, it has been found desirable to control the image path in real time. Thus, it has been desired to apply cross-channel color correction in real time; however, in terms of memory capacity and system architecture such processing has been rendered prohibitively expensive and otherwise impractical.

Heretofore, problems have been encountered in digital color printing as to consistency among various print engines in maintaining color uniformity; and particularly, for electrostatic printing engines employing intermediate transfer belts. Thus, it has been desired to provide a simple effective and low cost way of providing cross-channel color correction in real time for maintaining color uniformity in digital printing.

BRIEF DESCRIPTION

The present disclosure describes a technique for providing cross-channel correction in real time for digital color printing such that the full resolution value of a particular colorant is combined with low resolution versions of the remaining colors to provide a basis for correcting the selected colorant based upon the data for the other colorants employed. The pixel values of sub-samples of the remaining colorants are derived from the cell in which the full resolution selected colorant is taken; and, the desired output value may then be selected from a look-up table established for the known printing process.

The sub-sample values may be of the JPEG DC coefficient type or Display Resolution Image (DRI) pixel values and require only about a 4% increase in the bandwidth for each output colorant. The method is particularly suitable for spatial uniformity correction in printing systems employing print engines having an intermediate image transfer belt.

In addition to sub-sampling, additional compression can be applied to the low resolution channels thereby further reducing the bandwidth required for cross-channel process correction.

DETAILED DESCRIPTION

Figure 1:
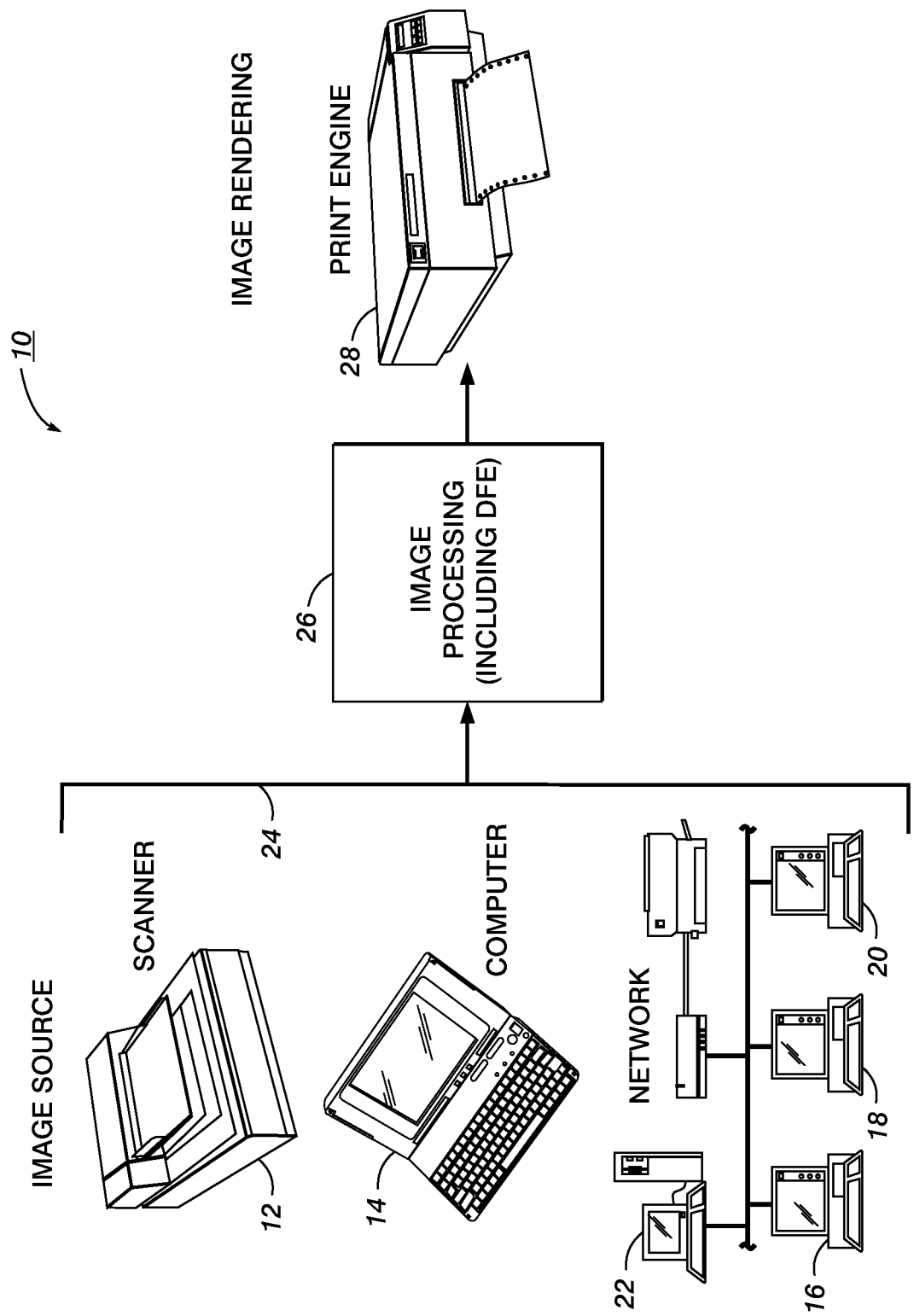
FIG. 1 is a pictorial schematic of a digital printing system.

Referring to FIG. 1, a digital printing system is indicated generally This is an example of a network and printing system of 10 and includes a scanner 12, an optional computer terminal 14, and a network comprising terminals 16, 18, 20 connected with other components such as a mainframe computer 22 all of which are operatively connected through a network 24 to an image processor which may include the digital front end (DFE) indicated by reference numeral 26 which provides a digital image output to a print engine 28. The DFE has memory and a processor for storing and executing instructions for providing the described functionality, for example multichannel sub-sampling.

Figure 2:
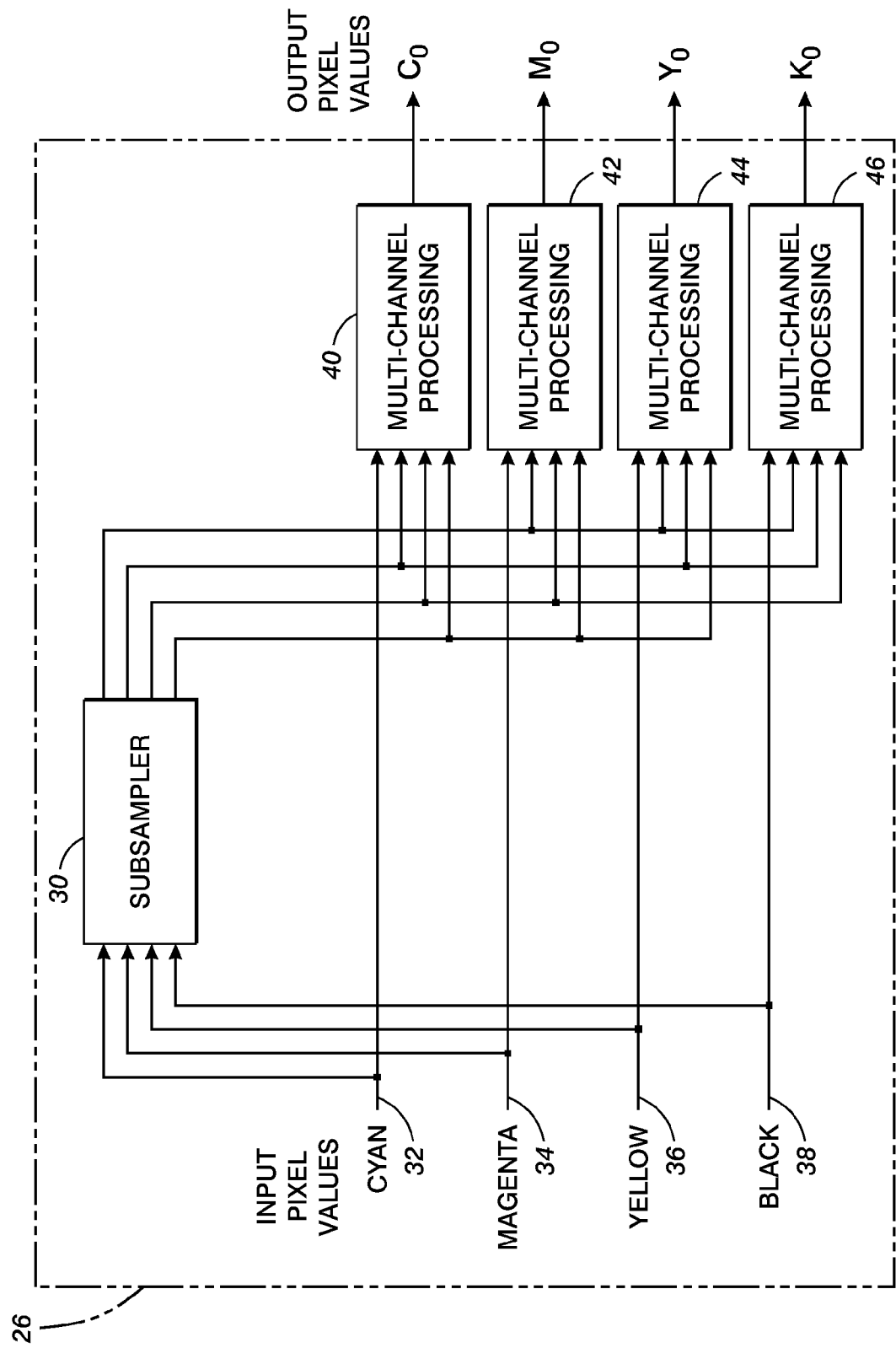
FIG. 2 is a flow diagram of the process for combining a selected colorant pixel value at full resolution with low resolution values for the other colorants employed for cross-channel correction.

Referring to FIG. 2, the operations of the image processor 26 are shown pictorially wherein the input pixel values for the individual colorants such as cyan (C), magenta (M), yellow (Y) and black (K) are inputted respectively along lines 32, 34, 36, 38 simultaneously to the sub-sampler 30 and individually to a multi-channel processing unit denoted respectively 40, 42, 44, 46. The sub-sampler is operative to provide a sub-sample of the full resolution pixel values for each colorant respectively and inputs the sub-samples respectively to the multi-channel processors for each of the other colorants employed. The multi-channel processors 40, 42, 44, 46 are operative to combine the full resolution pixel value respectively for the selected colorant inputted directly thereto along with the sub-sample low resolution pixel value signals for the other colorants to provide a respective output pixel value indicated respectively as $C_o$, $M_o$, $Y_o$ and $K_o$ in FIG. 2.

The low resolution sub-sample is obtained for each colorant by calculating averages of N×N windows in the image and it has been found satisfactorily to use N=8, but it will be understood that other values can be employed depending upon the application. The low resolution sub-sample may also be obtained by regular sub-sampling picking one pixel value out of the set of N×N pixels in the window, which is also known as decimation. Alternatively, averaging with weighted values prior to sampling may be employed to derive the sub-samples. Other order-statistic methods may be used to derive the sub-samples, such as using the maximum value, median value, or minimum value within the N×N window as the sub-sample value. Another alternative is to use the value derived as a result of other operations such as JPEG compression which calculates the DC value of every 8×8 pixel window. Thus, if the printing engine is processing the cyan value C at full resolution, it will have averages for M and Y across the corresponding N×N window in which the C pixel is located. Thus, if the full resolution pixel C has a spatial location in an 8×8 window, the print engine will have available the spatially averaged N value of the block going from row 1 to row 8 and from column 1 to column 8, and correspondingly for the averages of the Y sub-sample pixel values.

The output values of CMY may be determined from a look-up table such as set forth in Table I. The table may be constructed by choosing a set of gray levels and color combinations and printing color patches of these combinations which are measured to obtain correspondence between the CMY values for the particular print engine and the independent values in a color space such as CIE XYZ or CIE Lab. It will be understood that the characteristic of colors in the device dependent spaces such as CMY (or RGB) depend on the particular print engine that produces them.

TABLE I

| Cin | Min | Yin | Cout | Mout | Yout |
|---|---|---|---|---|---|
| 0 | 0 | 0 | 0 | 0 | 0 |
| 0 | 0 | 26 | 0 | 0 | 33 |
| 0 | 0 | 76 | 0 | 0 | 83 |
| 0 | 0 | 128 | 0 | 0 | 132 |
| 0 | 0 | 178 | 0 | 0 | 181 |
| 0 | 26 | 0 | 0 | 26 | 0 |
| 0 | 26 | 26 | 0 | 27 | 28 |

TABLE I-continued

| Cin | Min | Yin | Cout | Mout | Yout |
|---|---|---|---|---|---|
| 0 | 26 | 76 | 0 | 27 | 76 |
| 0 | 26 | 128 | 0 | 26 | 129 |
| 0 | 26 | 178 | 0 | 26 | 179 |
| 0 | 76 | 0 | 0 | 75 | 0 |
| 0 | 76 | 26 | 0 | 76 | 27 |
| 0 | 76 | 76 | 0 | 76 | 76 |
| 0 | 76 | 128 | 0 | 76 | 129 |
| 0 | 76 | 178 | 0 | 75 | 180 |
| 0 | 128 | 0 | 0 | 127 | 0 |
| 0 | 128 | 26 | 0 | 127 | 25 |
| 0 | 128 | 76 | 0 | 127 | 74 |
| 0 | 128 | 128 | 0 | 126 | 129 |
| 0 | 128 | 178 | 0 | 127 | 182 |
| 0 | 178 | 0 | 0 | 178 | 0 |
| 0 | 178 | 26 | 0 | 178 | 32 |
| 0 | 178 | 76 | 0 | 177 | 77 |
| 0 | 178 | 128 | 0 | 176 | 129 |
| 0 | 178 | 178 | 0 | 176 | 179 |
| 26 | 0 | 0 | 29 | 0 | 0 |
| 26 | 0 | 26 | 28 | 0 | 28 |
| 26 | 0 | 76 | 28 | 0 | 77 |
| 26 | 0 | 128 | 28 | 0 | 131 |
| 26 | 0 | 178 | 28 | 0 | 179 |
| 26 | 26 | 0 | 29 | 26 | 0 |
| 26 | 26 | 26 | 29 | 28 | 27 |
| 26 | 26 | 76 | 29 | 27 | 75 |
| 26 | 26 | 128 | 28 | 27 | 129 |
| 26 | 26 | 178 | 27 | 27 | 179 |
| 26 | 76 | 0 | 28 | 75 | 0 |
| 26 | 76 | 26 | 28 | 75 | 26 |
| 26 | 76 | 76 | 30 | 76 | 76 |
| 26 | 76 | 128 | 29 | 75 | 130 |
| 26 | 76 | 178 | 28 | 75 | 181 |
| 26 | 128 | 0 | 29 | 128 | 0 |
| 26 | 128 | 26 | 29 | 129 | 26 |
| 26 | 128 | 76 | 29 | 128 | 74 |
| 26 | 128 | 128 | 28 | 128 | 129 |
| 26 | 128 | 178 | 26 | 126 | 180 |
| 26 | 178 | 0 | 27 | 178 | 0 |
| 26 | 178 | 26 | 30 | 177 | 28 |
| 26 | 178 | 76 | 28 | 177 | 74 |
| 26 | 178 | 128 | 28 | 177 | 130 |
| 26 | 178 | 178 | 28 | 176 | 181 |
| 76 | 0 | 0 | 78 | 0 | 0 |
| 76 | 0 | 26 | 77 | 0 | 28 |
| 76 | 0 | 76 | 78 | 0 | 78 |
| 76 | 0 | 128 | 76 | 0 | 130 |
| 76 | 0 | 178 | 77 | 0 | 179 |
| 76 | 26 | 0 | 78 | 28 | 0 |
| 76 | 26 | 26 | 78 | 29 | 28 |
| 76 | 26 | 76 | 77 | 29 | 73 |
| 76 | 26 | 128 | 77 | 28 | 130 |
| 76 | 26 | 178 | 77 | 27 | 179 |
| 76 | 76 | 0 | 78 | 76 | 0 |
| 76 | 76 | 26 | 76 | 77 | 25 |
| 76 | 76 | 76 | 76 | 76 | 74 |
| 76 | 76 | 128 | 76 | 75 | 128 |
| 76 | 76 | 178 | 77 | 75 | 180 |
| 76 | 128 | 0 | 77 | 128 | 0 |
| 76 | 128 | 26 | 77 | 128 | 27 |
| 76 | 128 | 76 | 77 | 128 | 75 |
| 76 | 128 | 128 | 76 | 128 | 129 |
| 76 | 128 | 178 | 76 | 126 | 180 |
| 76 | 178 | 0 | 75 | 178 | 0 |
| 76 | 178 | 26 | 74 | 177 | 25 |
| 76 | 178 | 76 | 73 | 177 | 71 |
| 76 | 178 | 128 | 76 | 176 | 129 |
| 76 | 178 | 178 | 76 | 176 | 181 |
| 128 | 0 | 0 | 131 | 0 | 0 |
| 128 | 0 | 26 | 130 | 0 | 28 |
| 128 | 0 | 76 | 129 | 0 | 76 |
| 128 | 0 | 128 | 130 | 0 | 130 |
| 128 | 0 | 178 | 129 | 0 | 179 |
| 128 | 26 | 0 | 129 | 25 | 0 |
| 128 | 26 | 26 | 129 | 27 | 26 |
| 128 | 26 | 76 | 130 | 27 | 76 |
| 128 | 26 | 128 | 130 | 27 | 129 |
| 128 | 26 | 178 | 129 | 26 | 178 |
| 128 | 76 | 0 | 131 | 76 | 0 |
| 128 | 76 | 26 | 130 | 77 | 27 |
| 128 | 76 | 76 | 129 | 76 | 73 |
| 128 | 76 | 128 | 129 | 77 | 126 |
| 128 | 76 | 178 | 128 | 75 | 179 |
| 128 | 128 | 0 | 130 | 128 | 0 |
| 128 | 128 | 26 | 131 | 128 | 28 |
| 128 | 128 | 76 | 129 | 128 | 72 |
| 128 | 128 | 128 | 129 | 129 | 125 |
| 128 | 128 | 178 | 128 | 127 | 180 |
| 128 | 178 | 0 | 130 | 181 | 0 |
| 128 | 178 | 26 | 130 | 179 | 25 |
| 128 | 178 | 76 | 130 | 179 | 71 |
| 128 | 178 | 128 | 128 | 177 | 128 |
| 128 | 178 | 178 | 128 | 176 | 180 |
| 178 | 0 | 0 | 181 | 0 | 0 |
| 178 | 0 | 26 | 180 | 0 | 27 |
| 178 | 0 | 76 | 180 | 0 | 78 |
| 178 | 0 | 128 | 179 | 0 | 129 |
| 178 | 0 | 178 | 179 | 0 | 179 |
| 178 | 26 | 0 | 180 | 26 | 0 |
| 178 | 26 | 26 | 180 | 26 | 28 |
| 178 | 26 | 76 | 181 | 25 | 77 |
| 178 | 26 | 128 | 179 | 26 | 128 |
| 178 | 26 | 178 | 177 | 26 | 178 |
| 178 | 76 | 0 | 180 | 75 | 0 |
| 178 | 76 | 26 | 180 | 76 | 28 |
| 178 | 76 | 76 | 181 | 75 | 76 |
| 178 | 76 | 128 | 180 | 75 | 129 |
| 178 | 76 | 178 | 178 | 75 | 178 |
| 178 | 128 | 0 | 180 | 128 | 0 |
| 178 | 128 | 26 | 181 | 127 | 26 |
| 178 | 128 | 76 | 181 | 128 | 73 |
| 178 | 128 | 128 | 179 | 127 | 127 |
| 178 | 128 | 178 | 177 | 127 | 178 |
| 178 | 178 | 0 | 179 | 180 | 0 |
| 178 | 178 | 26 | 178 | 178 | 25 |
| 178 | 178 | 76 | 179 | 179 | 72 |
| 178 | 178 | 128 | 179 | 177 | 128 |
| 178 | 178 | 178 | 178 | 178 | 179 |

The CMY values that have been printed may then be correlated to the independent values such as Lab or XYZ. For example, if a particular print engine produces a Lab value of $L_0 a_0 b_0$ when printing with CMY values $C_0 M_0 Y_0$ when the desired Lab values are $L_1 a_1 b_1$, the look-up table is generated to map the $C_0 M_0 Y_0$ inputs to $C_1 M_1 Y_1$ values that produce the desired $L_1 a_1 b_1$ color value. In the present practice it has been satisfactory to construct a look-up table such as Table 1 from a selected subset of digital levels and construct a table for all possible combinations of those digital levels. If the input image contains CMY combinations that are not in the look-up table interpolation techniques are applied to obtain suitable output pixel values for the individual colorants.

For N digital levels for each of three colorants it is required to print and measure N×N×N patches; and, in a typical 8-bit printer, C, M and Y can take any integer value between 0 and 255 and thus the number of patches required to print measure would be prohibitive. Therefore, a lesser number has been used to build the look-up table such as Table 1, which is based on 125 patches.

Where one of the input CMY values is known at full resolution i.e. one of $C_0 = C_{in\_full}$, $M_0 = M_{in\_full}$ or $Y_0 = Y_{in\_full}$, and the other inputs are available at a sub-sampled resolution (two of $C_0 = C_{in\_sub}$, $M_0 = M_{in\_sub}$ or $Y_0 = Y_{in\_sub}$,), the full resolution output values $C_1 = C_{out\_full}$, $M_1 = M_{out\_full}$ and $Y_1 = Y_{out\_full}$ located in row i and column j may be determined from the formulas set forth below:

$$C_{out\_full}(i,j) = f(C_{in\_full}(i,j), M_{in\_sub}(\text{ceil}((i-1)/N), \text{ceil}(j/N)), Y_{in\_sub}(\text{ceil}((i-1)/N), \text{ceil}(j/N)))$$

$$M_{out\_full}(i,j)=g(C_{in\_sub}(\text{ceil}((i-1)/N),\text{ceil}(j/N)),$$
$$M_{in\_full}(i,j),Y_{in\_sub}(\text{ceil}((i-1)/N),\text{ceil}(j/N)))$$

$$Y_{out\_full}(i,j)=h(C_{in\_sub}(\text{ceil}((i-1)/N),\text{ceil}(j/N),$$
$$M_{in\_sub}(\text{ceil}(i-1)/N),\text{ceil}(j/N)),Y_{in\_full}(i,j)))$$

Where full denotes full-resolution data, sub denotes sub-sampled data, N is the sub-sampling rate), ceil(x) denotes rounding x up to its closest integer (rounding to the smallest integer larger than x), and f, g and h are the operations performed by the 3 multi-dimensional mappings, which can be DLUTs (f maps CMY in to C out, g maps CMY in to M out and h maps CMY in to Y out).

Where one of the input colorant values is known at full resolution, $A_{in\_full}$, and at least one other colorant is available at a sub-sampled resolution, $B_{in\_sub}$, the full resolution output value $A_{out\_full}$ located in row i and column j may be determined from the formula set forth below:

$$A_{out\_full}(i,j)=f(A_{in\_full}(i,j),B_{in\_sub}(\text{ceil}((i-1)/N),\text{ceil}(j/N)),\bullet)$$

where • refers to other colorants that may be used in the mapping.

Figure 3:
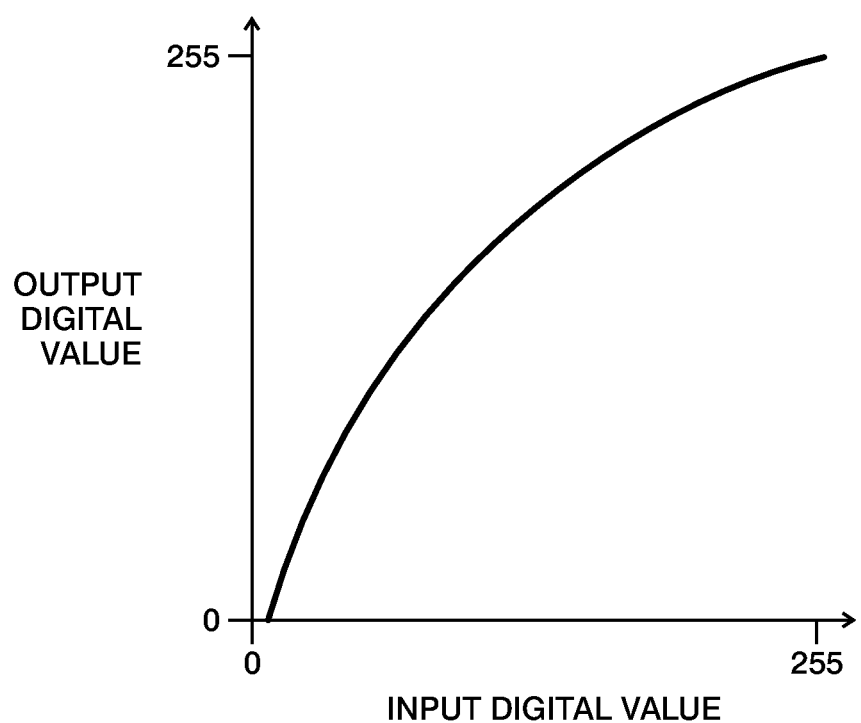
FIG. 3 is a graph of input digital pixel value as a function of output digital pixel value in the form of a tone reproduction curve.

In the example of FIG. 3, a surface plot of a mapping is employed to decrease the values of colorant A when colorant B has low values, and increase the value of colorant A when B has high values. In this example, colorant A would be input to the mapping at full resolution, colorant B would be input at sub-sampled resolution, and the output value for colorant A would be at high resolution.

The sub-sampling module 30 may utilize a simple averaging over the sub-sample area or other sub-sampling methods such as weighted averaging and non linear maximum, minimum and median sub-sampling may be used. If weighted averaging is used within a common sub-sampler, a common memory buffer for the weights that are applied to all the channels may be employed. An alternative arrangement would permit the sub-sampler to be adaptive such that different sub-sampling rates are used for the image data with different levels of complexity. In addition to sub-sampling, additional compression can be applied to the low resolution channels thereby further reducing the band width required of the cross panel process.

Alternatively, the sub-sample value can be derived as a result of other operations such as JPEG compression which calculates the DC value of every 8×8 pixel window. Thus, if the printing engine is processing the cyan value C at full resolution, it will have averages for M and Y across the corresponding N×N window in which the C pixel is located. Thus, if the full resolution pixel C has a spatial location in an 8×8 window, the print engine will have available the spatially averaged N value of the block going from row 1 to row 8 and from column 1 to column 8, and correspondingly for the averages of the Y sub-sample pixel values.

Another alternative, is to employ JPEG2000, which is a common image compression format, as a source of sub-sampled image data. JPEG2000 transforms the image into a set of two dimensional sub-band signals, each representing the activity of the image in various frequency bands at various spatial resolutions. Each successive decomposition level of the sub-bands has approximately half the horizontal and half the vertical resolution of the previous level. A reverse decomposition module within the sub-sampler reverses as many decomposition steps as necessary to obtain a low resolution version of the original image with resolution equal to the desired sub-sample spatial resolution utilized in the multi-dimensional mappings.

Yet another alternative is to use a sampler whose output is designed to produce a display resolution image, or a "thumbnail" view of the image.

In the present practice, it has been found satisfactory to employ a sub-sample of 1 out of 64 for an 8×8 pixel cell and 1 out of 256 for a 16×16 pixel cell for the colorants other than the selected colorant for full resolution.

The teachings herein have described an image path utilizing sub-sampled cross-channel image values using cyan, magenta, yellow and black as exemplary colorants. However, it has been found satisfactory for use with other colorants and colorant combinations, and particularly for printing systems employing more than four colorants. For example, some combination of gray, light cyan, light magenta, and dark yellow colorants, along with CMYK are used in certain printer to achieve a smoother appearance in image highlights. Orange, green and violet colorants are used in some printing systems for purposes of extending the gamut of achievable colors of the printer. Other examples of colorants that may be employed are red, blue, clear, and white. Other printing systems may use fewer colorants, such as a highlight color printer that prints black and one color.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An improvement in a system for digital image processing with multiple colorants comprising:
   (a) an image processor operable to generate CMYK pixel data for an image and operable to generate a first set of pixel values of a selected colorant from the CMYK data at its nominal full resolution;
   (b) a sub-sampler operable to generate a second set of pixel values for the image of another CMYK colorant at a substantially lower resolution than the nominal full resolution; and,
   (c) a multi-channel processor operable to combine the first and second set of pixel values and to derive modified pixel values for the first set.

2. The improvement defined in claim 1, wherein the multi-channel processor includes a look-up table of pixel values of the selected colorant in the substantially lower resolution pixel values of the at least one other colorant and modified pixel.

3. The improvement defined in claim 2, wherein deriving modified pixel values of the selected colorant at the nominal resolution includes deriving values for the selected colorant A, using at least one other colorant B employed at a substantially lowered resolution according to $$A_{out\_full}(i,j)=f(A_{in\_full}(i,j),B_{in\_sub}(\text{ceil}((i-1)/N),\text{ceil}(j/N)),\bullet)$$

Where full denotes full-resolution data, sub denotes sub-sampled data, N is the sub-sampling rate), ceil(x) denotes rounding x up to its closest integer (rounding to the smallest integer larger than x), f is the operation performed by a multi-dimensional mapping, that is, f maps $A_{in}$, $B_{in}$, •, to $A_{out}$, where • refers to other colorants that may be used in the mapping.

4. The improvement defined in claim 1, wherein the sub-sampler is operable to one of (a) simple average over a sub-sample area, (b) weighted average over a sub-sample area, (c)

the median of pixel values in the sub-sample area, (d) the minimum of pixel values in the sub-sample area, (e) the maximum of pixel values values in the sub-sample area and (f) decimation.

5. The improvement defined in claim 1, wherein the selected colorant at its nominal resolution and at least one other colorant employed at a substantially lowered resolution are taken from the set of colorants comprising cyan, magenta, yellow, black, orange, green, violet, light cyan, light magenta, gray, dark yellow, and clear.

6. The improvement defined in claim 1, wherein the multichannel processor includes a look-up table (LUT) of input pixel values of the selected colorant and pixel values of the at least one other colorant and modified output values of the selected colorant.

7. The improvement defined in claim 1, wherein the sub-sampler is operative to generate pixel values of a plurality of other colorants at a substantially lowered resolution.

8. The improvement defined in claim 1, wherein the multi-channel processor is operable to derive a modified pixel value for C, M, Y selected colorant according to $$C_{out\_full}(i,j)=f(C_{in\_full}(i,j),M_{in\_sub}(\text{ceil}((i-1)/N),\text{ceil}(j/N)),Y_{in\_sub}(\text{ceil}((i-1)/N),\text{ceil}(j/N)))$$

$$M_{out\_full}(i,j)=g(C_{in\_sub}(\text{ceil}((i-1)/N),\text{ceil}(j/N)),M_{in\_full}(i,j),Y_{in\_sub}(\text{ceil}((i-1)/N),\text{ceil}(j/N)))$$

$$Y_{out\_full}(i,j)=h(C_{in\_sub}(\text{ceil}((i-1)/N),\text{ceil}(j/N),M_{in\_sub}(\text{ceil}(i-1)/N),\text{ceil}(j/N)),Y_{in\_full}(i,j)))$$

Where full denotes full-resolution data, sub denotes sub-sampled data, N is the sub-sampling rate, ceil(x) denotes rounding x up to its closest integer (rounding to the smallest integer larger than x), and f, g and h are the operations performed by the 3 multi-dimensional mappings where f maps $CMY_{in}$ to $C_{out}$, g maps $CMY_{in}$ to $M_{out}$ and h maps $CMY_{in}$ to $Y_{out}$.

9. A method of controlling digital image processing employing multiple colorants comprising:
(a) generating pixel data for a plurality of individual colorants for an image and generating a first set of such data for a selected colorant therefrom at its nominal full resolution;
(b) generating a second set of pixel data for the image of another colorant selected therefrom at a substantially lower resolution than the nominal full resolution; and,
(c) combining the first and second set of pixel data and deriving modified pixel values for the first set.

10. The method defined in claim 9, wherein generating pixel data of individual colorants includes generating C, M, Y, K pixel data.

11. The method defined in claim 9 wherein the step of generating pixel data at a substantially lowered resolution includes sub-sampling.

12. The method defined in claim 11, wherein the step of sub-sampling includes sub-sampling at a ratio of one of 2:1, 4:1, 8:1, 16:1 and 32:1.

13. The method defined in claim 11, wherein the step of sub-sampling includes one of (a) simple averaging over a sub-sample area, (b) weighted averaging over a sub-sampled area, (c) the median of pixel values in the sub-sample area, (d) the minimum of pixel values in the sub-sample area, (e) the maximum of pixel values in the sub-sample area and (f) decimation.

14. The method defined in claim 9, wherein the step combining includes inputting the generated pixel values into a look-up table and obtaining the modified value therefrom.

15. The method defined in claim 9, wherein the step deriving a modified pixel value includes deriving one of (a) color chromaticity correction, (b) color uniformity correction, (c) color temporal stability correction and (d) modifying the width of lines.

16. The method defined in claim 9, wherein the step of generating pixel data of a lowered resolution includes generating pixel data from one of (a) JPEG DC coefficient, (b) at least one wavelet sub-band, (c) the display resolution image and (d) JPEG 2000.

17. The method defined in claim 9, wherein the step of generating pixel data at substantially lowered resolution includes generating such data for a plurality of other colorants employed.

18. The method defined in claim 9, wherein the step of deriving modified pixel values of the selected colorant includes deriving values for C, M, Y selected colorants according to $$C_{out\_full}(i,j)=f(C_{in\_full}(i,j),M_{in\_sub}(\text{ceil}((i-1)/N),\text{ceil}(j/N)),Y_{in\_sub}(\text{ceil}((i-1)/N),\text{ceil}(j/N)))$$

$$M_{out\_full}(i,j)=g(C_{in\_sub}(\text{ceil}((i-1)/N),\text{ceil}(j/N)),M_{in\_full}(i,j),Y_{in\_sub}(\text{ceil}((i-1)/N),\text{ceil}(j/N)))$$

$$Y_{out\_full}(i,j)=h(C_{in\_sub}(\text{ceil}((i-1)/N),\text{ceil}(j/N),M_{in\_sub}(\text{ceil}(i-1)/N),\text{ceil}(j/N)),Y_{in\_full}(i,j)))$$

Where full denotes full-resolution data, sub denotes sub-sampled data, N is the sub-sampling rate), ceil(x) denotes rounding x up to its closest integer (rounding to the smallest integer larger than x), and f, g and h are the operations performed by the 3 multi-dimensional mappings where f maps $CMY_{in}$ to $C_{out}$, g maps $CMY_{in}$ to $M_{out}$ and h maps $CMY_{in}$ to $Y_{out}$.

19. The method defined in claim 9, wherein the step of deriving modified pixel values of the selected colorant at the nominal resolution includes deriving pixel values for the selected colorant from one of (a) using at least one other colorant, (b) at a substantially lower resolution than the nominal resolution according to $$A_{out\_full}(i,j)=f(A_{in\_full}(i,j),B_{in\_sub}(\text{ceil}((i-1)/N),\text{ceil}(j/N)),\bullet)$$

Where full denotes full-resolution data, sub denotes sub-sampled data, N is the sub-sampling rate), ceil(x) denotes rounding x up to its closest integer (rounding to the smallest integer larger than x), f is the operations performed by 3 multi-dimensional mappings f maps $A_{in}$, $B_{in}$, •, to $A_{out}$, where • refers to other colorants that may be used in the mapping.

20. The method of claim 9 wherein the selected colorant at its nominal resolution and at least one other colorant employed at a substantially lowered resolution are taken from the set of colorants comprising cyan, magenta, yellow, black, orange, green, violet, light cyan, light magenta, gray, dark yellow, and clear.

* * * * *